United States Patent
Gustavsson et al.

(10) Patent No.: US 11,486,595 B2
(45) Date of Patent: Nov. 1, 2022

(54) DEFROSTING CYCLE CONTROL

(71) Applicant: SWEGON OPERATIONS AB, Kvänum (SE)

(72) Inventors: Andreas Gustavsson, Lidköping (SE); Daniel Oltegen, Lidköping (SE); Daniel Johansson, Lidköping (SE); Anders Fransson, Arvika (SE); Magnus Ahl, Mariestad (SE)

(73) Assignee: SWEGON OPERATIONS AB, Kvänum (SE)

(*) Notice: Subject to any disclaimer, the term of this patent is extended or adjusted under 35 U.S.C. 154(b) by 138 days.

(21) Appl. No.: 16/757,153

(22) PCT Filed: Oct. 16, 2018

(86) PCT No.: PCT/SE2018/051050
§ 371 (c)(1),
(2) Date: Apr. 17, 2020

(87) PCT Pub. No.: WO2019/078771
PCT Pub. Date: Apr. 25, 2019

(65) Prior Publication Data
US 2020/0240663 A1  Jul. 30, 2020

(30) Foreign Application Priority Data

Oct. 17, 2017 (SE) .................................. 1751286-4
Oct. 17, 2017 (SE) .................................. 1751287-2

(51) Int. Cl.
*F24F 11/41* (2018.01)
*F24F 12/00* (2006.01)

(52) U.S. Cl.
CPC ............ *F24F 11/41* (2018.01); *F24F 12/003* (2013.01)

(58) Field of Classification Search
CPC .. F24F 11/41; F24F 11/42; F24F 11/43; F24F 11/72; F24F 11/74; F24F 11/745; F24F 2110/40
(Continued)

(56) References Cited

U.S. PATENT DOCUMENTS

2004/0148950 A1  8/2004 Catzel
2008/0003940 A1*  1/2008 Haglid ................. F24F 12/006
454/228
(Continued)

FOREIGN PATENT DOCUMENTS

EP  2 546 581 A1  1/2013
EP  2 783 165 B1  3/2017
(Continued)

OTHER PUBLICATIONS

Extended European Search Report issued in European Patent Application No. 18869254.5 dated Jun. 17, 2021.
(Continued)

*Primary Examiner* — Nelson J Nieves
*Assistant Examiner* — Meraj A Shaikh
(74) *Attorney, Agent, or Firm* — Nixon & Vanderhye

(57) ABSTRACT

An Air Handling Unit for a ventilation system in a building has supply and extract air channels, each with an inlet and an outlet for guiding air to and from a building. Each air channel includes a damper controlling air flow. The air channels are in a heat exchanging relation to each other. The AHU also includes a fan and an Electronic Control Unit. The ECU outputs a defrost cycle initiation signal to defrost the heat recovery arrangement. The ECU outputs a defrost cycle termination signal to end the defrost cycle upon indication of the defrosting being completed. To optimize the defrost cycle time the ECU changes the first or second criterion for defrost cycle termination signal depending on the time for
(Continued)

performing the defrost cycle such that the time period of the defrost cycle is prolonged/shortened when the defrost cycle time period is shorter/longer than preferred.

20 Claims, 1 Drawing Sheet

(58) Field of Classification Search
USPC .................................................. 454/228, 239
See application file for complete search history.

(56) References Cited

U.S. PATENT DOCUMENTS

| 2008/0108295 | A1* | 5/2008 | Fischer | F24F 3/1423 |
| | | | | 454/239 |
| 2016/0238301 | A1 | 8/2016 | Denton | |
| 2017/0082308 | A1* | 3/2017 | Gokhale | F25D 21/02 |
| 2018/0180306 | A1* | 6/2018 | Aoyama | F24F 13/22 |

FOREIGN PATENT DOCUMENTS

| EP | 3 207 315 B1 | 3/2020 | |
| JP | 6246150 | 2/1987 | |
| JP | 6277538 | 4/1987 | |
| JP | 62123245 | 6/1987 | |
| JP | 07139785 | 5/1995 | |
| WO | 01/22021 A1 | 3/2001 | |
| WO | 2010/102627 A1 | 9/2010 | |
| WO | WO 2013/144441 | 10/2013 | |
| WO | 2016/060609 A1 | 4/2016 | |
| WO | WO-2016060609 A1 * | 4/2016 | ............ F28F 27/02 |
| WO | WO 2017/134807 | 8/2017 | |

OTHER PUBLICATIONS

International Search Report, PCT/SE2018/051050, dated Dec. 4, 2018.
Written Opinion, PCT/SED2018/051050, dated Dec. 4, 2018.

* cited by examiner

DEFROSTING CYCLE CONTROL

TECHNICAL FIELD

The present invention relates to an Air Handling Unit (AHU) for providing fresh air to a building. The invention is in particular directed to the feature of defrosting, or deicing, a heat recovery arrangement exchanging heat between the extract air flow and supply air flow in the AHU. The invention also relates to method for defrosting of an AHU.

BACKGROUND

In offices and other larger premises, there is often a need to be able to control the indoor climate separately in different parts of the premises or in individual rooms. An accurate local temperature and ventilation control is required to ensure a sufficient comfort level for the persons present in a building. Also heat generated by electric appliances and heat and exhaled air generated by persons inside the building have to be taken into account for the control. Together with the prevailing weather conditions, these factors have a large influence on the instantaneous demand for heating, cooling and ventilation capacity. Similar systems has lately been more commonly used also in smaller buildings, e.g. family houses, as there is a desire for better insulation and thus also a need for a forced change of air in these buildings. In order to improve the energy efficiency of buildings using air conditioning systems with controlled air intake/air outlet is there a desire to lower heat losses by exhausting warm air to the outside and reduce heat losses by heat exchanging exhaust air with fresh air.

Different systems for controlling the indoor climate in buildings are known previously. For instance, US2004/0148950 A1 discloses an air-conditioning system for a building that comprises a hot water circuit, a cold water circuit and several local air conditioning units. Each of the local air conditioning units comprises a fan for blowing air into a space in the building, a heating coil connected to the hot water circuit and/or a cooling coil connected to the cold water circuit. At least one temperature control system allows control of the heating power of the heating coils and the cooling power of the cooling coils. A calorific energy management system is provided with a heat pump for transferring calorific energy from the cold water system to the hot water system, from the cold water system to the outdoor air and from the outdoor air to the hot water system. The system is capable of managing the calorific energy transfers by means of a three level control system so as to optimize the energy consumption. In systems for controlling the indoor climate in buildings, it is common that at least one heat exchanger arranged in connection with the exhaust air duct forms part of a heat recovery system. Such a heat exchanger can, for example, be a cross-flow or counter-flow heat exchanger (also called plate heat exchangers) or a heat exchanger wheel, and can be used for reducing the total energy consumption of the system by recovering a portion of the heat energy from the exhaust air before it is discharged.

In order to further improve the heat recovery system it may also be provided with an additional heat pump which also transfers heat from the exhaust air duct to the supply air duct. When used for heat recovery, the heat pump part in the exhaust air duct function as an evaporator in order to absorb heat and transfer heat via a heat carrying media to a condenser in the supply air channel where heat is released. This will increase the total heat flow from the exhaust air duct to the supply air duct and thus also increase the cooling effect in the exhaust air duct in certain conditions, frost or ice may form on the heat exchanger and/or the evaporator of the heat pump. The heat recovery system should then be controlled to perform a defrost cycle, during which the heat exchanger or evaporator is heated to melt the ice. The heat recovery system could of course only comprise a heat pump and no heat exchanger.

One way of performing defrosting (or deicing) of the heat exchanger or evaporator is to use the hot airflow leaving the building for heating and defrosting. In this case is the cold flow usually restricted or completely shut off in the part of the heat exchanger which shall be defrosted. Such a system is for example described in EP 2 546 581 or WO 01/22021. However, there is always a loss in the energy efficiency during such a defrost cycle since the heat exchanger cannot be fully used for its normal purpose, that is to say heat recovery, which results in an undesirably high energy consumption. Hence, heat from the building to the outside will be lost to a higher degree during the defrost operation. In WO 2016/060 609 there is a method described which is particularly oriented to control the duration of defrost cycle for a heat exchanger having several heat exchanger portions in order to optimize the defrost operation. However, even though the system in WO 2016/060 609 may work perfectly well in the aspect described therein, there are still further measures which may be done to improve the defrosting operation generally used for a an Air Handling Unit (AHU) or Heating, Ventilation and Air Conditioning (HVAC) system comprising a heat exchanger or heat pump which may be subjected to ice formation.

It is therefore a desire for an improved control and device in order to provide a more efficient defrosting of a heat exchanger and a heat recovery system in the air treatment system in order to improve the overall energy efficiency of the system.

DISCLOSURE OF THE INVENTION

The object of the present invention is to provide an improved energy recovery and more efficient defrosting for an Air Handling Unit (AHU) to be used in a ventilation system in a building.

The AHU according to the invention comprises an extract air channel for guiding air from the house or building to the outside, i.e. a channel for exhausting air from a building to the outside. The extract air channel have at least one extract air inlet and in the general case is there only one extract air inlet which in turn may be connected to a main channel which in turn may be connected to a multitude of channels for extracting air from different parts of a building. However, the AHU may have more than one extract air inlet if desired. The extract air channel further comprises at least one extract air outlet for exhausting the flow of extract air from a building to the outside. If desired, there could of course be further extract air outlets in the system or some kind of exhaust manifold connected to the extract air outlet.

The AHU further comprises a supply air channel for guiding supply air, or fresh air, from outdoor into a building or structure. The supply air channel is provided with at least one supply air inlet for intake of fresh air and at least one supply air outlet for delivering fresh air into a house or building, usually via a supply air channel system for distribution of the air in the building. There may of course be several supply air inlets or outlets as described above for the extract air channel.

In the AHU are there one or several supply air dampers and one or several extract air dampers located in the supply air channel respectively the extract air channel in order to control the air flow in the respective channels. The dampers may be located at the inlets and/or outlets to the main body of the AHU but may also be located at a distance from the air inlets or outlets in the AHU main body connected via a ducting arrangement.

The AHU is also provided with a heat recovery arrangement such that the heat in the exhausted extract air may be regained before it is discharged from the building. The heat recovery arrangement may for example be a heat exchanger and/or a heat pump. Such a heat exchanger can for example be a cross-flow or counter-flow heat exchanger (also called plate heat exchangers) or a heat exchanger wheel. Hence, the extract air channel and the supply air channel are designed to be in a heat exchanging relation to each other by the use of a heat recovery arrangement.

If a heat pump is used, it includes a first media phase change unit located in the supply air channel and a second media phase change unit located in the extract air channel in order to transfer heat between the supply air channel and the extract air channel. By media phase change unit is meant an evaporator, condenser or a unit being able to be used both as evaporator and condenser. In case both units may be used as evaporator and condenser may the heat pump be designed to be able to operate in both normal mode and reversed mode, i.e. the heat pump may be used to transfer heat in either direction between the supply air channel and the extract air channel. This is particularly useful when there for example is a desire to reverse the heat flow in the heat pump from being in a heat recovery mode during normal operation in cold weather when there is a desire to use the heat pump to regain heat from the extract air stream to be in a reversed mode in case of an ice buildup in the AHU. This may for example occur on the media phase change unit operating as evaporator in the extract air. By reversing the heat flow in the heat pump will the icy phase change unit start to work as a condenser and the heat pump will contribute to the defrosting of the icy surfaces of the media phase change unit.

The AHU further includes at least one fan in the supply air channel and/or the extract air channel in order to induce a flow of air in the AHU. To be noted, the fan and or the dampers described before must not be comprised in the same casing as the heat recovery arrangement in order to form part of the AHU but may be remotely located in the ducting system. However, in general there is a fan located in the exhaust air channel as well as in the supply air channel within the same casing as the heat recovery arrangement.

The AHU also includes an Electronic Control Unit (ECU) in order to control the operation of the AHU, e.g. the heat recovery process and to perform defrost operations when needed. The ECU may be connected to various sensors and control devices and programmed to control the air treatment system in dependence of input from various sensors by providing output control signals to various control devices. The ECU may be a single entity or may comprise several entities so as to form an ECU, e.g. may sensor signals be processed by some kind of processor comprised in the sensor which thus forms part of the ECU. The ECU could be located in the AHU or be a central unit located at a remote location.

The kind of system described above is in particular useful in cold climates where a lot of heat may be regained by heat exchanging warm extract air from inside the building with cold supply air from the outside. In order to be able to recover as much heat as possible, it is desired to cool down the extract air exhausted as much as possible. There may thus be a risk for ice growth on the heat recovery system as a result of the cooling down of the extract air, which often is rather humid, in the heat exchanger when the temperature is below zero degrees Celsius. In the case of a heat pump used, there is a frost risk also when the temperature is above zero degrees Celsius. Ice on the heat exchanger or heat pump will decrease the heat exchange efficiency in the heat exchanger or heat pump, thus reducing the heat recovery, and also increase the pressure drop over the heat exchanger such that there is needed an increased force, and thus increased energy consumption, in order to provide a desired air flow through the heat exchanger.

A beneficial configuration of the AHU is that the first media phase change unit is located in the supply air channel downstream of the heat exchanger and said second media phase change unit is located in the extract air channel downstream of the heat exchanger. This means that when the AHU is set to work in heat recovery mode will the air flows in the respective channels, i.e. the supply air channel and extract air channels, first be heat exchanged and thereafter will the remaining heat in the extract air be used to further heat the supply air leaving the heat exchanger. The heat exchanger, e.g. a rotating heat exchanger wheel, is well adapted to efficiently recover heat when the temperature differences in the air flows are significant but may not work well when there are small temperature differences meanwhile a heat pump may regain heat also when the heat differences are small or even negative.

The ECU is programmed to output a defrost cycle initiation signal during certain conditions. The defrost cycle initiation signal includes a control signal to a flow controller, such as an air damper or a fan, or a heating element in order to change or heat the air flow to operate in a defrost mode to defrost the heat recovery arrangement. The defrost cycle initiation signal will be outputted when there is an indication of an undesired high level of ice in a portion of the heat recovery arrangement. The signal will be sent according to a first predefined criterion, e.g. a pressure drop over some part thus indicating a more restricted flow path due to ice formation. The ECU is further programmed to send a defrost cycle termination signal in order to end the defrost cycle when there is an indication of the defrosting being completed according to a second criterion, e.g. that the pressure drop has decreased below a certain threshold. The AHU may thus be provided with a pressure indicating system connected to the ECU. The pressure indicating system may for example comprise a pair of pressure sensors located upstream and downstream of a device which shall be checked for ice buildup such that a pressure drop over the device may be measured. The first and second criteria may thus be pressure drops measured over a heat recovery arrangement by a pair of pressure sensors or pressure indicating arrangement located upstream and downstream of a heat recovery arrangement, e.g. a phase changing unit (evaporator) of a heat pump.

There may also be other indications of an undesired high level of ice in the heat exchanger or heat pump, e.g. could the ice buildup in the heat exchanger be estimated from temperature measurements and/or humidity levels in the air. Concerning the problem related to frosting or ice buildup in the heat exchanger is this problem in general originating from exhausting hot and humid indoor air being cooled down to temperatures below zero and the condensing and freezing of moist in the exhaust air. Hence, if the system comprises means for estimating the humidity in the extract air leaving the building it may be calculated at what temperature the humidity in the air will condense and ice formation start. The absolute humidity in the extract air may for example be calculated from measuring the relative humidity and temperature of the extract air, e.g. in the extract air inlet, or by measuring the absolute humidity directly by any known means. When the absolute humidity is known, it may easily be derived at what temperature the moisture in the air will condense and there is a risk for ice formation in the heat exchanger. As is obvious, the temperature must be below zero degrees Celsius in order to have ice formation.

Hence, the AHU may be provided with means for estimating the temperature in the heat exchanger portions. There are several relevant places where a thermometer may be located, e.g. outdoor, in the supply air inlet or in the extract air outlet downstream the heat recovery arrangement. The specific temperature measured which shall correspond to a risk for frosting of the heat exchanger may thus be dependent on where the temperature is measured. The outdoor temperature may be measured or a more accurate temperature measurement may for example be to measure the temperature by a thermometer in the coldest part of the heat exchanger and use the measurements therefrom as a more correct way for indicating frost risks.

The AHU may thus be provided with means for estimating or measuring these parameters. It may be possible to only use other parameters than pressure drop for deciding when to start a defrost operation. Regardless of which method that is used for estimating when to perform a defrost cycle, the level of ice buildup when it is desired to initiate a defrost operation may vary from case to case. Hence, the method may work for different ways of deciding when there is an undesired high level of ice buildup in the heat exchanger or heat pump setting different levels of ice buildup as acceptable limits before a signal is sent for initiating a defrost operation. However, since there are pressure sensors or means for estimating the pressure drop over the heat exchanger or heat pump present in the AHU anyway in many cases, it is in general suitable to use a limit of a measured or estimated pressure drop over a heat exchanger or a heat pump for triggering a defrost initiation signal.

Regardless of which method which is used for setting the defrost ignition and termination levels, there is a desire to control the defrost cycles efficiently. Even though defrosting or deicing operation of the AHU may be efficient is there generally a loss in the heat recovery efficiency, alternatively a reduced flow of supply air and/or increased energy consumption by the AHU from heating devices, during a defrost cycle. Hence, in whatever manner a defrost operation is performed, there is a desire to minimize the time when an AHU is operating in defrost a mode due to reduced energy efficiency, in particular there is a desire to end the defrost mode directly when the heat pump or heat exchanger is defrosted. However, it is also desired to assure that the selected subject to be defrosted will be completely defrosted in order to avoid frequent repetitions of defrosting cycles, which also influence the overall heat recovery efficiency in a negative way.

In order to provide energy efficient defrost operation could it be of importance to have defrost cycles being performed within certain time limits. Hence, the ECU could be programmed to change the first predefined criterion for outputting a defrost cycle initiation signal or the second criterion for outputting a defrost cycle termination signal depending on the time duration for performing the defrost cycle in order to adjust the next defrost cycle to more likely be performed within a prescribed time period.

For example, the first predefined criteria for outputting a defrost cycle initiation signal could be a first pressure drop limit and the second criteria for outputting a defrost cycle termination signal could be a second pressure drop limit. The setting of the initiation signal and the termination signal could be dependent on the time for performing the defrost cycle. If pressure drops are used as a trigger for the initiation and/or the termination signal, they could be set such that the time of the defrost cycle should have been increased (increased pressure drop for initiation or decreased pressure drop for termination) if the changed first or changed second criteria had been used for the defrost cycle initiation or termination signal when the defrost cycle is shorter than a first predefined time period. Likewise, pressure drop limits could be set such that the time of the defrost cycle should have been decreased (decreased pressure drop for initiation or increased pressure drop for termination) if the changed first or changed second criteria had been used for the defrost cycle initiation signal when the defrost cycle is longer than a second predefined time period.

Hence, the changed initiation signal or termination signal is amended such that the time period of the defrost cycle should have been increased if the changed first or changed second criterion had been used for the defrost cycle initiation signal respectively the defrost cycle termination signal when the defrost cycle is shorter than a first predefined time period. This would for example be the case if the initiation signal is based on a pressure drop value and the defrost cycle is shorter than desired why the initiation signal is changed to be outputted at a higher pressure drop.

Likewise, the changed initiation signal or termination signal is amended such that the time period of the defrost cycle should have been decreased if the changed first or changed second criterion had been used for the defrost cycle initiation signal respectively the defrost cycle termination signal when the defrost cycle is longer than a second predefined time period. This would for example be the case if the initiation signal is based on a pressure drop value and the defrost cycle is longer than desired why the initiation signal is changed to be outputted at a lower pressure drop.

It is thus possible to shift either the defrost initiation signal and/or defrost termination signal for the defrost cycle. However, in general is the defrost termination signal set such that the defrost cycle will end when there has been an optimized defrosting operation of the AHU why it in most cases will be the first predefined criteria for the defrost cycle initiation signal which is changed in order to perform a defrost cycle within a desired time interval.

In general, there is a desire to control the defrosting operation such that it terminates as soon as the heat exchanger portion is defrosted but not before the defrosting is complete. In order to optimize the overall efficiency of the AHU it may comprise an ECU which adapts its predefined settings for when to initiate a defrost cycle. The defrost cycle is in this case thought to have a desired target time or time interval. This means that the predefined limit of the criteria, e.g. a pressure drop, is increased respectively decreased when the defrost cycle is shorter than a first predefined time period respectively longer than a second predefined time period. In this way, the ECU is adapting the starting criteria of a defrost cycle in order to adjust the duration of a defrost cycle to be within a desired time interval or targeting a desired time of a cycle. For example, if the defrost cycle is 20 percent longer than what is desired, the pressure drop limit will be lowered, e.g. by 20 percent. In the next cycle, the cycle time is 5 percent shorter than what is desired and the next pressure drop limit will be set to 5 percent higher than the last pressure drop limit. This example is assuming, or using, a linear dependence between the defrost cycle time and the pressure drop value. This is most probably not completely correct but will most probably work good enough in order to slowly get closer to a desired value. The control system could also comprise some kind of learning function, e.g. to record relevant temperatures, humidity and supply air demand, in order to create a directory storing relevant pressure drop values depending on different conditions. Alternatively, or in addition to the above directory, there may be pressure drop curves versus time stored or made such that a relevant pressure drop value may be read from a curve suitable for the present conditions.

In order to use a pressure drop for deciding when to perform a defrost operation could the AHU be provided with a pressure indicating system in order measure the pressure drops in the AHU and verify if the first and second criteria are fulfilled.

The pressure indicating system could be designed to measure pressure drops in the extract air channel, e.g. by measuring the pressure in the extract air channel upstream respectively downstream of the heat recovery arrangement, e.g. a heat exchanger and/or a heat pump.

If a heat pump is used, it comprises a media phase change unit in the extract air channel as well as in the supply air channel. In the system disclosed, the portion or part in the AHU which is most likely to be subject to ice formation is most probably the media phase change unit in the extract air channel when being used as evaporator, i.e. absorbing heat from the extract air. Concerning the problem related to frosting or ice buildup in the heat exchanger is this problem often originating from the hot indoor air, which often is rather humid, being cooled down to temperatures below zero and the condensing and freezing of moist in the air. Ice on the heat exchanger or heat pump will decrease the heat exchange efficiency in the heat exchanger or heat pump, thus reducing the heat recovery, and also increase the pressure drop. Since the pressure drop over the heat exchanger or heat pump increases with ice growth is it possible to detect an icing condition in the heat exchanger or heat pump by measuring the pressure drop over the heat exchanger. Hence, the extract air channel may be provided with pressure indicating means or pressure sensors for estimating or measuring a pressure drop over the heat exchanger or heat pump in the extract air channel. The measurements may be made by measuring the absolute pressure in the extract air channel upstream respectively downstream of the heat exchanger or heat pump in order to calculate a pressure drop over the heat pump. Alternatively, the pressure drop may be measured directly by using a differential pressure sensor connected to a space in the extract air channel upstream the heat exchanger or heat pump via a first pressure communicating conduit and connected to a space in the extract air channel downstream the heat exchanger or heat pump via a second pressure communicating conduit such that a differential pressure over the heat exchanger or heat pump is measured by the differential pressure sensor.

The ECU could be connected to the pressure indicating means or pressure sensors in order to receive input signals from these sensors. The ECU is preferably also connected to flow controllers, e.g. the supply air damper and the extract air damper, in order to send control signals to these flow controllers. The ECU may also be programmed to output a defrost cycle initiation signal when there is an indication of an undesired high level of ice in the heat exchanger or heat pump system, e.g. from sensing an increased pressure drop somewhere in the AHU being above a defined limit. The ECU may be programmed to switch the function of the AHU from a normal heat recovery mode to a defrost mode and start a defrost cycle when the pressure indicating system estimates a pressure drop over the second media phase change unit above a first predefined limit. In case a pressure drop limit is used by the ECU for initiating a defrost cycle is it suitable to program the ECU to switch off the defrost mode and end the defrost cycle when the pressure indicating system estimate a pressure drop below a second predefined limit. Using a heat pump arrangement, the ECU may be programmed to set said media phase change unit in the supply air channel to function as an condenser in order to release heat to the fresh intake air and the media phase change unit in the extract air channel to function as an evaporator absorbing heat from the exhaust air channel when the AHU is working in its normal heat recovery mode. When a defrost operation is desired could the ECU be programmed to set said the media phase change unit in the supply air channel to function as an evaporator in order to absorb heat from its surroundings and the media phase change unit in the extract air to function as a condenser in order to release heat to its surroundings when the AHU is working in its defrost mode. Hence, a reversible heat pump may be useful both for heat recovery and defrost operation. The defrost cycle initiation signal thus implies a possibility for various control signals to be sent from the ECU. The ECU could for example be programmed to send a control signal to flow controllers, e.g. one or several dampers, and change the flow channel configuration from admitting a large supply air flow when the AHU is in the heat recovery mode to reduce or restrict the supply air intake after a defrost initiation signal setting the AHU to be in a defrost mode. The defrost initiation signal preferably also changes the settings or positions of other dampers and other flow controllers. By restricting the flow of supply air by the supply air damper will cooling effect be reduced and accumulated ice start to defrost by the warm flow of exhaust air from the building in the extract air and supply air channels. In addition, fans and possible by-pass dampers or recirculation dampers may be controlled.

The AHU may be further designed to include a short cut connection connecting the supply air channel with the extract air channel. The short cut connection could be designed such that it is connecting the supply air channel upstream of the heat recovery arrangement, e.g. a heat exchanger and a media phase change unit of a heat pump, with the extract air channel downstream of the heat recovery arrangement. The short cut connection is provided with a short cut damper which controls a flow of air between the supply air channel and the extract air channel. In normal mode, when the AHU is working for ventilating a building and provide fresh air to the building, is this channel normally closed such that there is no mixture of extract air and supply air. However, the opening of the damper and the admitting of extract air to the supply air channel via the shortcut connection could be used to improve a defrosting operation while also reducing or even completely preventing the exhaust of relatively hot air from a building to the surroundings without a proper heat regeneration of the heat content in the extract air due to the defrost operation of the AHU. This means that if the short cut connection is opened may the extract air first flow through the heat recovery arrangement in the extract air channel where after the air may flow through the short cut connection and into the supply air channel and through the heat recovery arrangement before being recirculated into a building.

In order to control the extract air flow and the supply air flow to allow them to pass in their respective channels during normal heat recovery mode and to recirculate the extract air as described above and being able to control the supply air to decrease or being shut off could the AHU be designed such that the extract air damper is located in the vicinity of the extract air outlet and the supply air damper is located in the vicinity of the supply air inlet.

The defrost initiation signal preferably changes the settings or positions of the short cut damper or other dampers. The ECU may be programmed to set the short cut damper in the short cut connection to be essentially closed when the AHU is operating in a heat recovery mode. When changing to a defrost mode, the short cut damper is changed to be essentially open. In addition to change the position of the short cut damper when switching to a defrost mode could the ECU be programmed to switch the extract air damper and supply air damper from being set to essentially open when the AHU is in a heat recovery mode to set the extract air damper and supply air damper to be essentially closed when the AHU is working in a defrost mode. Alternatively, the ECU could be programmed to set the extract air damper and supply air damper to be essentially open when the AHU is in a heat recovery mode and to switch the extract air damper to be essentially closed while the supply air damper is maintained in an open position, partially or fully open, when the AHU is working in a defrost mode after defrost initiation signal.

By restricting the flow of supply air by the supply air damper will cooling effect be reduced and accumulated ice start to defrost by the warm flow of exhaust air from the building in the extract air and supply air channels. Hence, the flow has been controlled in order to defrost without the need for specific heating arrangement even though it may be possible to incorporate additional heating devices.

The invention also relates to a method for defrosting of an Air Handling Unit, AHU, for a ventilation system in a building, e.g. such an AHU as disclosed above. The AHU comprises a supply air channel for guiding supply air from the outdoor into a building and an extract air channel for guiding extract air from a building to the outside. The supply air channel and the extract air channel are in a heat exchanging relation to each other via a heat recovery arrangement, e.g. a heat exchanger and/or a heat pump. The AHU is further provided with a pressure indicating system connected to the ECU. The method comprises the steps of:
  outputting a defrost cycle initiation signal including a control signal to a flow controller, such as an air damper or a fan, or a heating element in order to change or heat the air flow to defrost said heat recovery arrangement when there is an indication of an undesired high level of ice in a portion of said heat recovery arrangement according to a first predefined criteria
  Output a defrost cycle termination signal in order to end the defrost cycle when there is an indication of the defrosting being completed according to a second criteria.

The method further comprises an adaptation for of the defrost cycle time period by including a step in which
  the first predefined criteria for output a defrost cycle initiation signal or the second criteria for output of a defrost cycle termination signal depending on the time for performing the defrost cycle such that
    the time period of the defrost cycle should have been increased if the changed first criterion or changed second criterion had been used for the defrost cycle initiation signal respectively the defrost cycle termination signal when the defrost cycle is shorter than a first predefined time period
    or
    the time period of the defrost cycle should have been decreased if the changed first criterion or changed second criterion had been used for the defrost cycle initiation signal respectively the defrost cycle termination signal when the defrost cycle is longer than a second predefined time period.

In general, the time period for the defrost cycle corresponds to the amount of ice formation on the device to be defrosted. In case there is need of a too long defrost cycle, it could indicate the formation of ice is so quick that the heat recovery on the AHU not is able to recover heat efficiently due to the ice formation. If the criteria for initiating the defrost cycle is changed such that the defrost cycle is shorter will it most certainly also imply a shorter heat recovery cycle thus reducing the time during ice formation will occur and thus stop the heat recovery cycle before too much ice is built up and the efficiency of the heat recovery mode is seriously affected. On the contrary, if the time for the defrost cycle is too short is it possible that the defrost cycle is starting before the ice formation contributes with any significant negative impact on the heat recovery thus causing the defrost cycle to start too early to be efficient for the overall energy efficiency. Hence, by changing the criteria for initiating and/or terminating the defrost cycle such that it will longer will most certainly allow more ice formation, but still without any serious impact on the heat transfer function, and also allow the AHU to be in its energy efficient heat recovery mode for a longer time.

According to one aspect of the method is the first predefined criteria for output a defrost cycle initiation signal a first, higher pressure drop limit and the second criteria for output of a defrost cycle terminating signal is a second, lower pressure drop limit. Hence, the pressure drop for initiating a defrost cycle is higher than the pressure drop for a terminating a defrost cycle. In this case will these limits be changed in order to adapt the defrost cycle period to be within a desired time interval if the time period is too long or too short. In case the defrost time period is too short may the limits be changed such that:
  the first, higher pressure drop limit is increased and/or the second, lower pressure drop limit is decreased when the defrost cycle is shorter than a first predefined time period. For example, the threshold for starting the defrost cycle will be increased and thus more ice will be allowed to form before the defrost cycle is started and the defrost cycle time period will thus be longer since more ice needs to be melted.

Alternatively, if the defrost time period is too long may the limits be changed such that:
  the first, higher pressure drop limit is decreased and/or the second, lower pressure drop limit is increased when the defrost cycle is longer than a second predefined time period. For example, the threshold for starting the defrost cycle will be decreased and thus less ice will be allowed to form before the defrost cycle is started. This means that the defrost cycle may start before it is needed to perform a defrost operation for an efficient operation of the AHU there will be an excessive amount of defrost cycles performed over time thus decreasing the energy efficiency of the AHU.

BRIEF DESCRIPTION OF THE DRAWINGS

The present invention will now be described more in detail with reference to the appended drawings, where.

DETAILED DESCRIPTION

Figure 1:
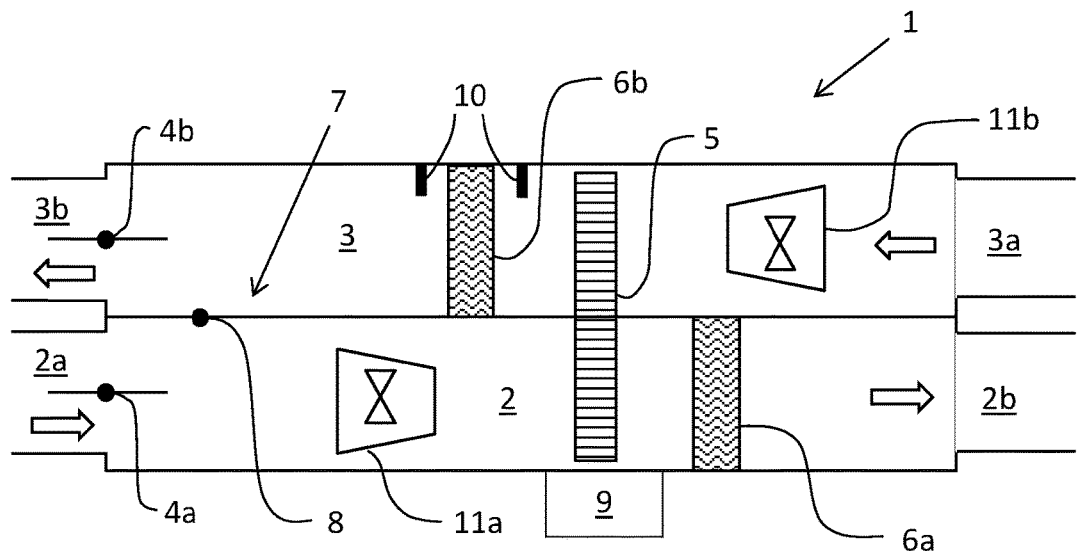
FIG. 1 discloses an Air Handling Unit (AHU) in heat recovery mode
Figure 2:
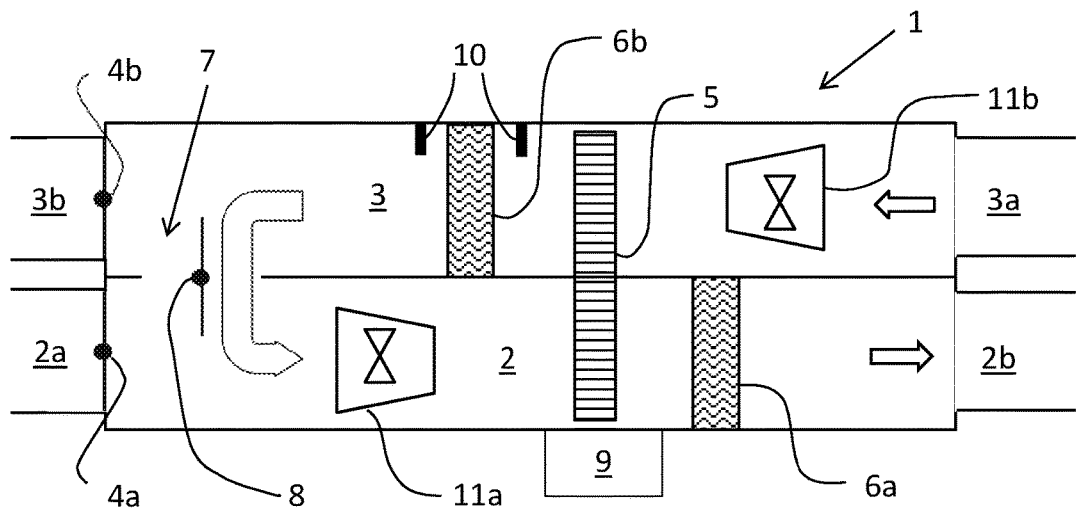
FIG. 2 discloses the AHU from FIG. 1 being in defrost mode
Figure 3:
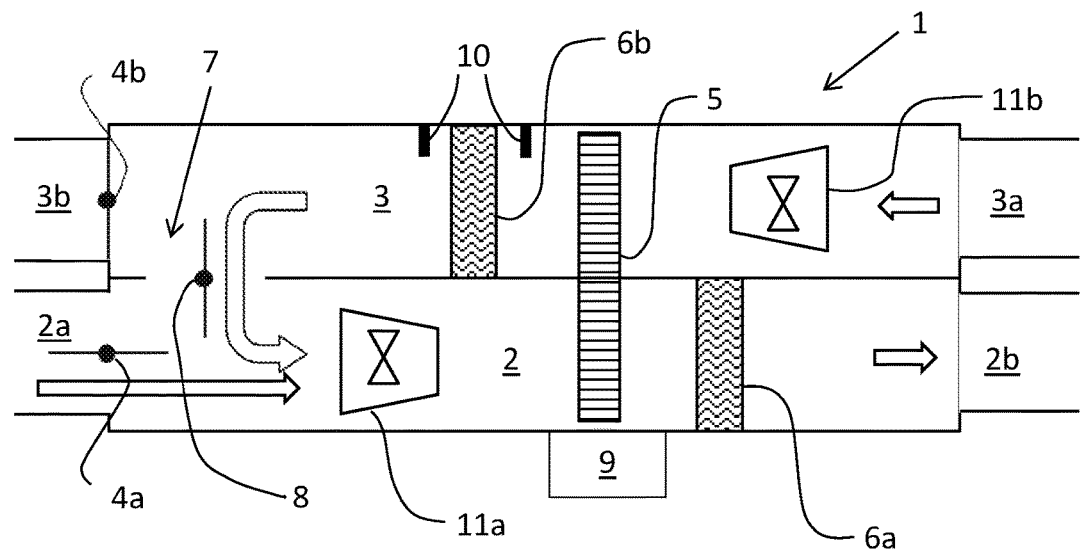
FIG. 3 discloses the AHU from FIG. 1 being in an alternative defrost mode

In FIGS. 1-3 is disclosed an Air Handling Unit (AHU) 1 according to an embodiment of the invention. The AHU 1 comprises a supply air channel 2 having a supply air inlet 2a and a supply air outlet 2b for delivering fresh air to an air ventilation system in a building. The AHU further comprises an extract air channel 3 having an extract air inlet 3a receiving extract air, also commonly called exhaust air or indoor air, and guiding the extract air to the outside through an extract air outlet 3b. Hence, the left side of the AHU in the figures is intended to be connected to the surroundings or outdoor while the right side of the figures is intended to be connected to an air ventilation system in a building for distribution of fresh air to the building and extraction of exhaust air from the interior of the building. In order to control the air flow in the supply air channel 2 is the AHU 1 provided with a supply air damper 4b in the supply air channel 2 close to the supply air outlet 2b. In a similar way is the extract air channel 3 provided with an extract air damper 4b close to the extract air outlet 3b in order to control the flow of exhaust air in the extract air channel 3. The AHU is further provided with a heat exchanger 5, which for example may be a heat exchanger wheel, which is located to be in contact with and exchange heat between the flows of air in the supply air channel 2 and extract air channel 3. The AHU 1 also comprises a heat pump system 6 having a first media phase change unit 6a located in the supply air channel 2 and a second media phase change unit 6b located in the extract air channel 3. The heat pump system 6 transfers heat between the flow of air in the supply air channel 2 and extract air channel 3. Heat is transferred by using a heat transfer media which may evaporate and condense in the first and second media phase change units 6a, 6b. Hence, the media phase change units 6a, 6b may shift between working as evaporator and condenser such that the heat pump system 6 function as a reversible heat pump and may be configured to transfer heat in either direction, i.e. transfer heat to the air flow in the supply air channel 2 from the air flow in the extract air channel 3 or vice versa. As can be seen in the figures, the first and second media phase change units 6a, 6b are located downstream of the heat exchanger 5 in the supply air channel 2 as well as the extract air channel 3.

The AHU is further provided with a short cut connection 7 through which air may flow between the supply air channel 2 and extract air channel 3. The air flow through the shirt cut connection 7 is controlled by a short cut damper 8. The shortcut connection 7 connects the supply air channel 2 upstream of the heat exchanger 5 and the first media phase change unit 6a with the extract air channel 3 downstream of the heat exchanger 5 the second media phase change unit 6a.

The AHU 1 is also connected to an Electronic Control Unit (ECU) 9 which may be connected to relevant features in order to receive control inputs and measured data of relevant parameters or to output relevant control instructions to flow control devices. For example, the ECU may receive inputs such as measurements from pressure indicating means 10, thermometers (not shown), humidity sensors (not shown) or control inputs from an input unit or remote control. The ECU 9 may also send control outputs to flow controllers such as the supply air damper 4a, the extract air damper 4b, the short cut damper 8, a supply air fan 11a or an extract air fan 11b as well as control instructions to the heat pump system 6 or heat exchanger 5.

FIGS. 1-3 disclose the same embodiment of the AHU 1 but disclosing the AHU 1 to be controlled differently in order to be in a heat recovery mode (FIG. 1) or in a defrost mode (FIGS. 2 and 3).

FIG. 1 thus discloses the AHU being in a heat recovery mode, i.e. a mode in which heat from the extract air in the extract air channel 3 is transferred to the air flowing into a building via the supply air channel 2. Heat is transferred via the heat exchanger 5 and the heat pump system 6. The heat pump system 6 is controlled by the ECU 9 such that the first media phase change unit 6a in the supply air channel 2 is working as a condenser and thus releasing heat to the surrounding air and the second media phase change unit 6b in the extract air channel 3 is working as an evaporator thus absorbing heat from the extract air.

In this heat recovery mode, according to FIG. 1, is the short cut connection 7 closed by the short cut valve 8 while both the supply air damper 4a and extract air damper 4b in the supply air channel 2 respectively extract air channel 3 are completely open.

If this mode is used during winter time, e.g. having an outdoor temperature below zero degrees, and wanting an indoor temperature of about 20 degrees, the indoor air leaving the building via the extract air channel 3 will first be cooled down in the heat exchanger 5, e.g. to a temperature close to zero degrees or even somewhat below, before continuing to the second media phase change unit 6b in the heat pump system 6. When the air comes in contact with the second media phase change unit 6b, which functions as an evaporator, and further cools the extract air to temperatures well below zero degrees Celsius, will the water content in the extract air condense and start to freeze on the cold surface of the second media phase change unit 6b. As the time passes will the layer of ice grow thicker on the second media phase change unit 6b and when sufficient time have passed will there be an ice layer which significantly decreases the heat exchange function in the heat pump and thus the overall efficiency of the AHU while also increasing the pressure drop over the second media phase change unit 6b. The initiation of a defrost cycle may for example be controlled by detecting the pressure drop over the second media phase change unit 6b by the pressure drop estimating means 10, which for example may be a pressure sensor upstream of respectively a pressure sensor downstream of the second media phase change unit 6b which thus may easily be used by the ECU to calculate the pressure drop and when the pressure drop is above a certain limit should there be a signal sent indicating a change to defrost mode should occur. Hence, when the pressure indicating system 10 indicates a pressure drop above a first predefined limit the ECU 9 is programmed to output a defrost cycle initiation signal. This defrost ignition signal may thus comprise control outputs from the ECU 9 causing the AHU 1 to change to defrost mode and be configured as described in FIG. 2 or 3.

In FIG. 2 is shown how a defrost mode or defrost cycle may be performed. The short cut connection 7 has been fully opened by the short cut damper 8 switching position and both the supply air damper 4a and extract air damper 4b in the supply air channel 2 respectively extract air channel 3 have been completely switched and are now completely closed. Hence, there will be no flow of fresh, supply air in the AHU in this mode disclosed in FIG. 2 but only recirculation of exhaust air entering through the extract channel inlet 3a, passing the heat exchanger 5 and the second media phase change unit 6b, now switched to function as evaporator in order to heat the surroundings. The air flow of exhaust air is thereafter guided to the supply air channel 2 via the short cut connection 7 in order to flow through the heat exchanger once more but now on the supply air channel 2 side before the flow continues to the first media phase change unit 6b now working as evaporator in order to cold the air flow passing by.

This mode will thus enable a heating operation of the second media phase change unit 6b working both from the outside and inside. The exhaust air will heat on the outside by the relatively hot flow of exhaust air, which no longer will be significantly cooled in the heat exchanger 5 before reaching the second media phase change unit 6b, since there is no fresh, cool supply air entering the AHU 1. In addition, the reversal of the heat pump system will heat the second media phase change unit 6b from the inside by condensing the cooling media inside. The defrost mode will continue until there is a control signal from the ECU indicating that the heat pump system 5 has been defrosted.

The defrost mode disclosed in FIG. 3 is similar to the one disclosed in FIG. 2 but in this case is the supply air damper 4a in the supply air inlet 2a open allowing cold supply air to enter. However, even if the supply air damper 4a is open will the flow of supply air into the supply air channel 2 be rather small since there is a recirculating flow. This defrost mode has the benefit of allowing a certain exchange of air in the building and some supply air to enter into the building also during defrost operation.

However, such a configuration of the dampers as disclosed in FIG. 3 also has the drawback of prolonging the defrost operation in the general case since colder air will enter into the system and by flowing through the heat exchanger 5 thus cool down the heat exchanger somewhat which means that the extract air will be somewhat more cooled down in the heat exchanger before reaching the second media phase change unit 6b and also contribute to a colder flow reaching the first media phase change unit 6b and thus also somewhat lowering the efficiency of the heat pump system 6 in its operation as a heating device which heats the second media phase change unit 6b from the inside.

During the defrost operation as described in FIG. 2 or 3, ice will melt and the pressure drop will thus decrease. When the pressure indicating system 10 indicates a pressure drop below a second predefined limit the ECU 9 is programmed to output a defrost cycle termination signal including control outputs causing the system to return to its normal heat recovery mode as disclosed in FIG. 1. This defrost termination signal may thus comprise control outputs from the ECU 9 causing the AHU 1 to change to normal heat recovery mode and be configured as described in FIG. 1. In case the defrost cycle time period was longer than a predetermined time period limit, the first pressure drop limit for the next defrost cycle initiation signal could be decreased and if the defrost cycle time period was shorter than a predetermined time period limit, the first pressure drop limit for the next defrost cycle initiation signal could be increased.

The above embodiments only serve as an example of how the invention may be carried out. For example, the AHU need not to be provided with a recirculation function at all, neither is and heat pump necessary. In addition, a defrost operation could for example be performed by reducing the flow of cold supply air from the outside. The AHU could also be provided with some electrical heating arrangement to improve the defrost operation.

Hence, the above described idea may function for a wide variety of AHUs having the need of a defrosting operation regardless of how the design of the heat recovery system is.

The invention claimed is:

1. An Air Handling Unit (AHU) for a ventilation system in a building, said AHU having comprising:
    a supply air channel comprising
        at least one supply air outlet,
        at least one supply air inlet configured to guide supply air from the outside into the building through the at least one supply air outlet,
        a supply air damper configured to control the air flow in the supply air channel;
    an extract air channel comprising
        at least one extract air outlet,
        at least one extract air inlet configured to guide extract air from the building to the outside through the at least one extract air outlet, and
        an extract air damper configured to control the air flow in the extract air channel, said supply air channel and said extract air channel being in a heat exchanging relation with respect to each other via a heat recovery system including one or more of a heat exchanger and a heat pump;
    at least one fan configured to induce a flow in said AHU and an electronic controller programmed to output a first defrost cycle initiation signal including a control signal to start a first defrost cycle to one of: (i) a flow controller that is one of an air damper and the at least one fan, and (ii) a heater to change or heat the air flow to defrost said heat recovery system when there is an indication of an undesired high level of ice in a portion of said heat recovery system according to a first predefined criterion and a first defrost cycle termination signal to end the first defrost cycle when there is an indication of the defrosting being completed according to a second predefined criterion; and
    a pressure indicator connected to the electronic controller, wherein said first and second predefined criteria are pressure drops measured over the heat recovery system, and
    said electronic controller is further programmed to change one of: (i) the first predefined criterion that is a first pressure drop limit to output a subsequent, second defrost cycle initiation signal to start a subsequent, second defrost cycle, and (ii) the second predefined criterion that is a second pressure drop limit to output a subsequent, second defrost cycle termination signal to end the subsequent, second defrost cycle depending on a time to perform the subsequent, second defrost cycle such that the time to perform the subsequent, second defrost cycle is: (i) when the first defrost cycle is shorter than a first predefined time period, and (ii) decreased when the first defrost cycle is longer than a second predefined time period.

2. The AHU (1) according to claim 1, wherein said first predefined criterion for the defrost cycle initiation signal is changed.

3. The AHU according to claim 1, wherein the pressure indicator is configured to measure pressure drops in said extract air channel by measuring the pressure in the extract air channel upstream and downstream of the heat exchanger or the heat pump.

4. The AHU according to claim 1, wherein the air flow through the air supply inlet is reduced or restricted during the defrost cycle.

5. The AHU according to claim 1, further comprising a short cut connection connecting the supply air channel with the extract air channel.

6. The AHU according to claim 5, wherein the short cut connection is connecting the supply air channel upstream of the heat recovery system that includes the heat exchanger and the heat pump, the extract air channel being downstream of the heat recovery system.

7. The AHU according to claim 5, wherein said electronic controller is programmed to set a short cut damper in the short cut channel to be essentially closed when the AHU is in a heat recovery mode and to set the short cut damper to be essentially open when the AHU is working in a defrost mode.

8. A method for defrosting of an Air Handling Unit (AHU) for a ventilation system in a building, said AHU having a supply air channel configured to guide supply air from the outside into the building, an extract air channel configured to guide extract air from the building to the outside, and a pressure indicator configured to measure or calculate pressure in the AHU, said supply air channel and said extract air channel being in a heat exchanging relation to each other via a heat recovery system including one or more of a heat exchanger and a heat pump, said method comprising:
   outputting a first defrost cycle initiation signal including a control signal to start a first defrost cycle to a flow controller or a heater to change or heat the air flow to defrost said heat recovery system when there is an indication of an undesired high level of ice in a portion of said heat recovery system according to a first predefined criterion that is a first, higher pressure drop limit;
   outputting a first defrost cycle termination signal to end the first defrost cycle when there is an indication of the defrosting being completed according to a second predefined criterion that is a second, lower pressure drop limit that is lower than the first, higher pressure drop limit;
   changing the first, higher pressure drop limit to output a subsequent, second defrost cycle initiation signal to start a subsequent, second defrost cycle or the second, lower pressure drop limit to output a subsequent, second defrost cycle termination signal to end the subsequent, second defrost cycle depending on a time to perform the subsequent, second defrost cycle such that:
      (i) one or more of the first, higher pressure drop limit used for the subsequent, second defrost cycle initiation signal is increased and the second, lower pressure drop limit used for the subsequent, second defrost cycle termination signal is decreased when the first defrost cycle is shorter than a first predefined time period such that the time period of the subsequent, second defrost cycle is increased, or
      (ii) one or more of the first, higher pressure drop limit used for the subsequent, second defrost cycle initiation signal is decreased and the second, lower pressure drop limit used for the subsequent, second defrost cycle termination signal is increased when the first defrost cycle is longer than a second predefined time period such that the time period of the subsequent, second defrost cycle is decreased.

9. The method according to claim 8, wherein said pressure drop is measured in the extract air channel over a phase change forming part of a heat pump system.

10. The method of claim 8, wherein the flow controller is one of an air damper and a fan.

11. The AHU according to claim 2, wherein the pressure indicator is configured to measure pressure drops in said extract air channel by measuring the pressure in the extract air channel upstream and downstream of the heat exchanger or the heat pump.

12. The AHU according to claim 2, wherein the air flow through the air supply inlet is reduced or restricted during the defrost cycle.

13. The AHU according to claim 3, wherein the air flow through the air supply inlet is reduced or restricted during the defrost cycle.

14. The AHU according to claim 2, further comprising a short cut connection connecting the supply air channel with the extract air channel.

15. The AHU according to claim 3, further comprising a short cut connection connecting the supply air channel with the extract air channel.

16. The AHU according to claim 4, further comprising a short cut connection connecting the supply air channel with the extract air channel.

17. The AHU according to claim 6, wherein said electronic controller is programmed to set a short cut damper in the short cut channel to be essentially closed when the AHU is in a heat recovery mode and to set the short cut damper to be essentially open when the AHU is working in a defrost mode.

18. The AHU according to claim 11, wherein the air flow through the air supply inlet is reduced or restricted during a defrost cycle.

19. The AHU according to claim 11, further comprising a short cut connection connecting the supply air channel with the extract air channel.

20. The AHU according to claim 12, further comprising a short cut connection connecting the supply air channel with the extract air channel.

* * * * *